(12) United States Patent
Minami (10) Patent No.: US 11,392,072 B2
(45) Date of Patent: Jul. 19, 2022

(54) POWER SUPPLY APPARATUS CONFIGURED TO CONTROL PLURALITY OF POWER SUPPLY CIRCUITS

(71) Applicant: CANON KABUSHIKI KAISHA, Tokyo (JP)

(72) Inventor: Yutaro Minami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 16/983,013

(22) Filed: Aug. 3, 2020

(65) Prior Publication Data

US 2021/0055683 A1 Feb. 25, 2021

(30) Foreign Application Priority Data

Aug. 21, 2019 (JP) .............................. JP2019-151372

(51) Int. Cl.
*G03G 15/00* (2006.01)
*G06F 1/30* (2006.01)
(52) U.S. Cl.
CPC .............. *G03G 15/80* (2013.01); *G06F 1/30* (2013.01); *G03G 2221/1657* (2013.01)

(58) Field of Classification Search
CPC ... G03G 15/80; G03G 2221/1657; G06F 1/30
See application file for complete search history.

(56) References Cited

U.S. PATENT DOCUMENTS

2020/0122265 A1\* 4/2020 Kawai ................... B23K 9/073
2021/0006065 A1 1/2021 Minami

FOREIGN PATENT DOCUMENTS

JP 2002-354812 A 12/2002

\* cited by examiner

*Primary Examiner* — Sophia S Chen
(74) *Attorney, Agent, or Firm* — Venable LLP (57) ABSTRACT

A first power supply circuit supplies power to a load. A second power supply circuit connected to the first power supply circuit in parallel supplies power to the load together with the first power supply circuit. A monitoring unit monitors a current flowing from the first power supply circuit to the load. A switch disconnects the second power supply circuit and the load when a current flowing from the first power supply circuit to the load has not reached a predetermined value and connects the second power supply circuit and the load when a current flowing from the first power supply circuit to the load has reached a predetermined value.

17 Claims, 8 Drawing Sheets

POWER SUPPLY APPARATUS CONFIGURED TO CONTROL PLURALITY OF POWER SUPPLY CIRCUITS

BACKGROUND OF THE INVENTION

Field of the Invention

The present invention relates to a power supply apparatus configured to control a plurality of power supply circuits.

Description of the Related Art

A fixing apparatus fixes a toner image to a sheet by heating a toner image while conveying the sheet between two rotating bodies. Because the two rotating bodies are pressed together, a high-torque motor is required to rotate them. Such a motor requires a power supply apparatus that is able to output a large current. According to Japanese Patent No. 4398111, it is proposed to output a large current by connecting two switching power supplies in parallel.

Due to mass production, there is a variation between a first switching power supply apparatus and a second switching power supply apparatus that are connected in parallel to a load. Therefore, there are cases where an output voltage of the first switching power supply apparatus is higher than an output voltage of the second switching power supply apparatus. In such cases, if the output current of the first switching power supply apparatus reaches a rated current, then the second switching power supply apparatus is only able to output an output current that is smaller than the rated current. Thus, it becomes difficult to fully bring out the capability of the second switching power supply apparatus. Therefore, the present invention aims to fully bring out the capabilities of a plurality of power supply circuits even if there is a difference between the output voltages of a plurality of power supply circuits.

SUMMARY OF THE INVENTION

The present invention provides a power supply apparatus comprising the following elements. A first power supply circuit is configured to supply power to a load. A second power supply circuit is connected to the first power supply circuit in parallel and is configured to supply power to the load together with the first power supply circuit. A monitoring unit is configured to monitor a current flowing from the first power supply circuit to the load. A switch is arranged between the second power supply circuit and the load and is configured to connect and disconnect the second power supply circuit and the load in accordance with a monitoring result of the monitoring unit. The switch is configured to disconnect the second power supply circuit and the load in a case where a current flowing from the first power supply circuit to the load has not reached a predetermined value and to connect the second power supply circuit and the load in a case where a current flowing from the first power supply circuit to the load has reached a predetermined value.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

<Image Forming Apparatus>

Figure 1:
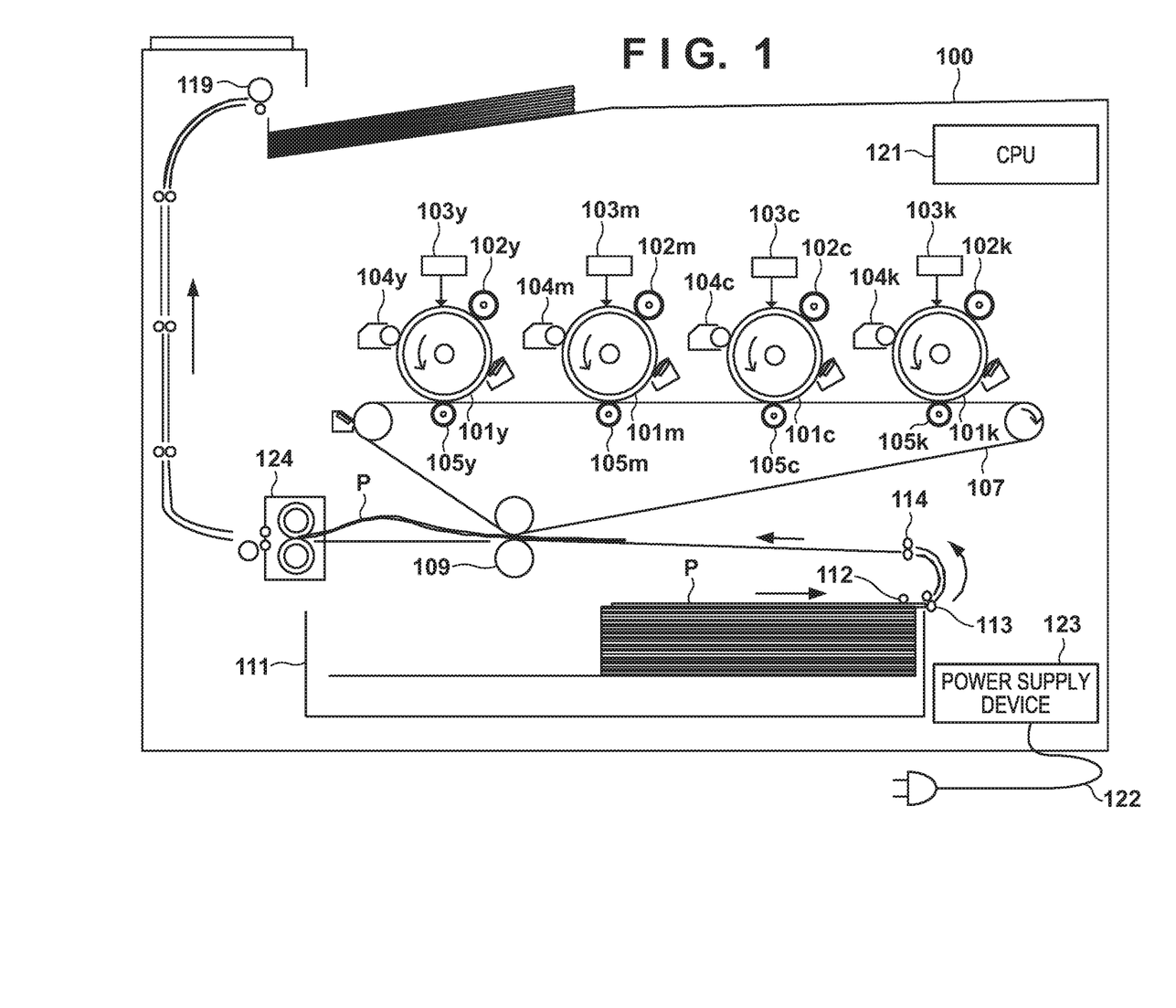
FIG. 1 is a view for describing an image forming apparatus

An image forming apparatus 100 illustrated in FIG. 1 is an example of an image forming apparatus on which a power supply device according to the first and second embodiments can be applied. The image forming apparatus 100 forms an image using different colors of toner such as yellow "Y", magenta "M", cyan "C", and black "K". Note that the ymck characters added to the end of the reference numerals indicate the colors of toner and that the ymck characters will be omitted when a matter that is common to the four colors is described.

A photosensitive drum 101 is an image carrier that carries an electrostatic latent image or a toner image, and a charger unit 102 charges the surface of the photosensitive drum 101. An exposure device 103 emits light to the surface of the photosensitive drum 101 in forming an electrostatic latent image. A developing unit 104 develops the electrostatic latent image using toner and then forms a toner image. A primary transfer unit 105 transfers the toner image from the photosensitive drum 101 to an intermediate transfer body 107.

A feed cassette 111 is a container for storing a plurality of sheets P. A feed roller 112 feeds the sheets P one at a time to a conveyance path. Conveyance rollers 113 and 114 convey the sheet P to a secondary transfer unit. A secondary transfer unit is formed by a secondary transfer roller 109 and the intermediate transfer body 107 contacting. The secondary transfer roller 109 transfers the toner image from the intermediate transfer body 107 to the sheet P. A fixing apparatus 124 adds heat and pressure to the sheet P and the toner image in fixing the toner image to the sheet P. A discharge roller 119 discharges the sheet to the outside of the image forming apparatus 100. A power supply device 123 comprises a power supply circuit that converts an alternating current supplied from a commercial power supply 122 to a direct current. A CPU 121 controls the image forming apparatus 100.

<Power Supply Device and Load>

Figure 2:
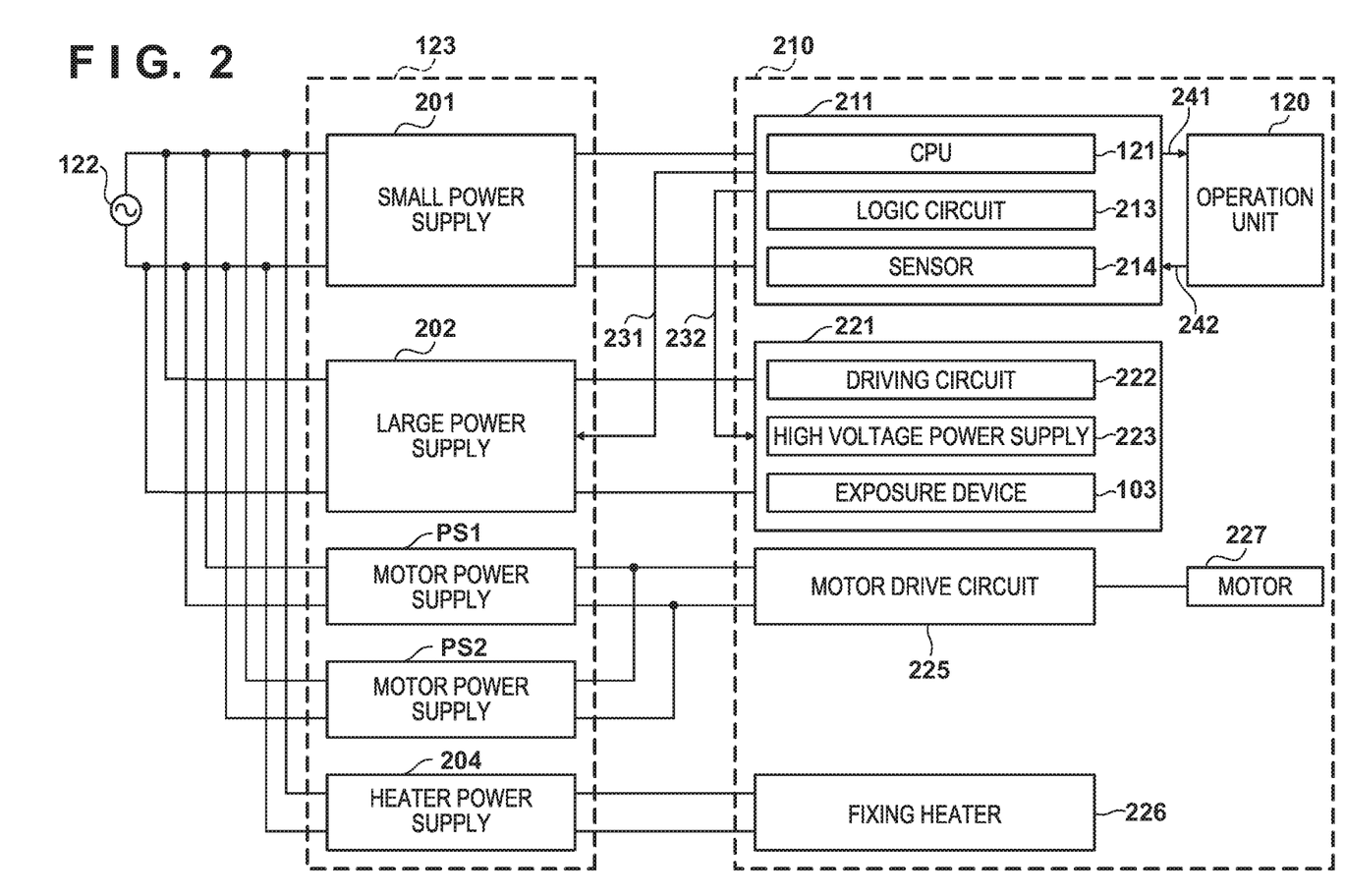
FIG. 2 is a view for describing a power supply device

As illustrated in FIG. 2, the power supply device 123 comprises a plurality of power supply circuits. A load 210 also comprises a variety of loads. The power supply device 123 comprises a small power supply 201, a large power supply 202, motor power supplies PS1 and PS2, and a heater power supply 204. Each power supply may be a switching power supply.

The small power supply 201 is a power supply that operates at all times when the commercial power supply 122 is connected. The small power supply 201 supplies power to a group of loads 211. The group of loads 211 comprises the CPU 121, a logic circuit 213, and a sensor 214, for example. The CPU 121 is a processor circuit that comprehensively controls the image forming apparatus 100. For example, the CPU 121 outputs a signal 231 that controls the large power supply 202 and a signal 232 that controls a group of loads 221 based on a user instruction via an input signal 242 from an operation unit 120 or a network. The operation unit 120 displays information to a user based on a signal 241 outputted from the CPU 121. The logic circuit 213 controls the load in accordance with a detection result of the sensor 214. The sensor 214 is a sensor that detects user operation and such, for example.

The large power supply 202 is a power supply that supplies power to the group of loads 221. The large power supply 202 is a power supply that operates based on the signal 231 outputted from the CPU 121. The group of loads 221 comprises a driving circuit 222, a high voltage power supply 223, and the exposure device 103. The driving circuit 222 drives a motor, a solenoid, and such. The high voltage power supply 223 generates a charging voltage, a developing voltage, and a transfer voltage.

The motor power supplies PS1 and PS2 are switching power supplies connected in parallel to a motor 227 which is a load, via a motor driving circuit 225. The motor 227 is a driving source that drives and causes two rotating bodies (e.g. a fixing roller and a pressure roller) that constitute the fixing apparatus 124 to rotate. The motor driving circuit 225 drives the motor 227 based on a power supplied from the motor power supplies PS1 and PS2. Note that the motor power supplies PS1 and PS2 are assumed to not be able to drive the motor 227 at a speed required for fixation when independent of each other. The heater power supply 204 is a power supply that supplies power to a fixing heater 226.

<Fixing Apparatus>

Figure 3:
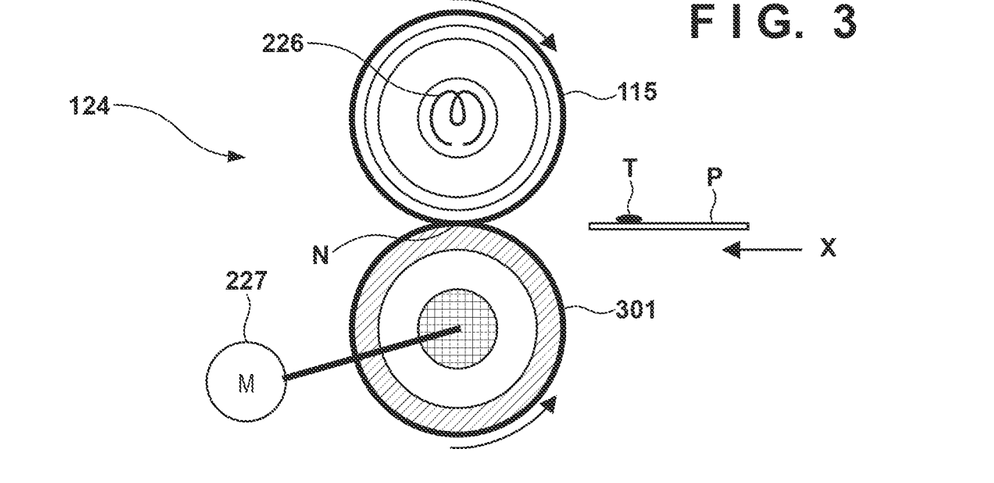
FIG. 3 is a view for describing a fixing apparatus

As illustrated in FIG. 3, the fixing apparatus 124 comprises a fixing roller 115, a pressure roller 301, and the fixing heater 226. The fixing heater 226 is arranged in the fixing roller 115. The heat generated by the fixing heater 226 propagates to the surface of the fixing roller 115 and further heats a toner image T and the sheet P. The pressure roller 301 is a rubber roller that is arranged opposite from the fixing roller 115. By having the pressure roller 301 add pressure toward the center of the fixing roller 115, a nip region N is formed at the point of contact between the fixing roller 115 and the pressure roller 301. The motor 227 drives the pressure roller 301. The fixing roller 115 is driven in rotating against the pressure roller 301. This makes the sheet P to be conveyed in the conveyance direction indicated by an arrow X.

<Problem with Connecting Power Supplies in Parallel>

Incidentally, uses of the electrophotographic image forming apparatus 100 are expanding from office use to commercial printing use. In commercial printing, high-speed printing and an ability to print on a wide variety of sheets P are required. To increase the speed of the image forming apparatus 100, an increase in the size of the fixing apparatus 124 is required. Also, to rotate the enlarged pressure roller 301 at high speed, a large amount of electric power (a large current) must be supplied to the motor 227. Thus, in the first embodiment, sufficient power is supplied to the motor 227 by connecting two motor power supplies PS1 and PS2 in parallel.

Figure 4:
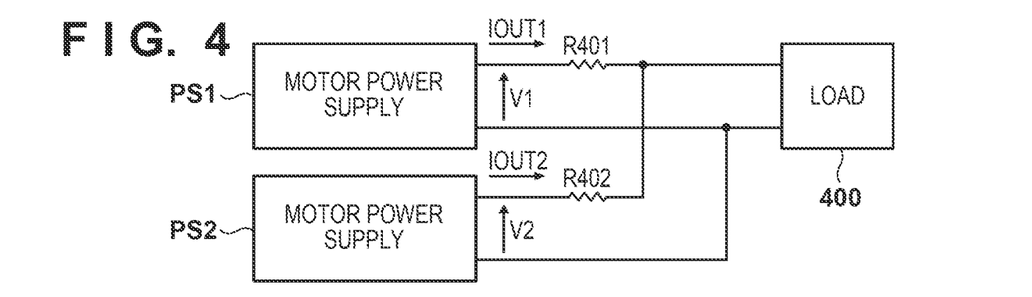
FIG. 4 is a view for describing a comparative example

FIG. 4 illustrates a comparative example. The motor power supplies PS1 and PS2 are the same type of products (mass-produced products). However, an output voltage V1 of the motor power supply PS1 is assumed to be higher than an output voltage V2 of the motor power supply PS2 due to manufacturing variation. Thus, to match the voltages applied to a load 400, a resistor R401 is arranged between the motor power supply PS1 and the load 400. Similarly, a resistor R402 is arranged between the motor power supply PS2 and the load 400.

Figure 5:
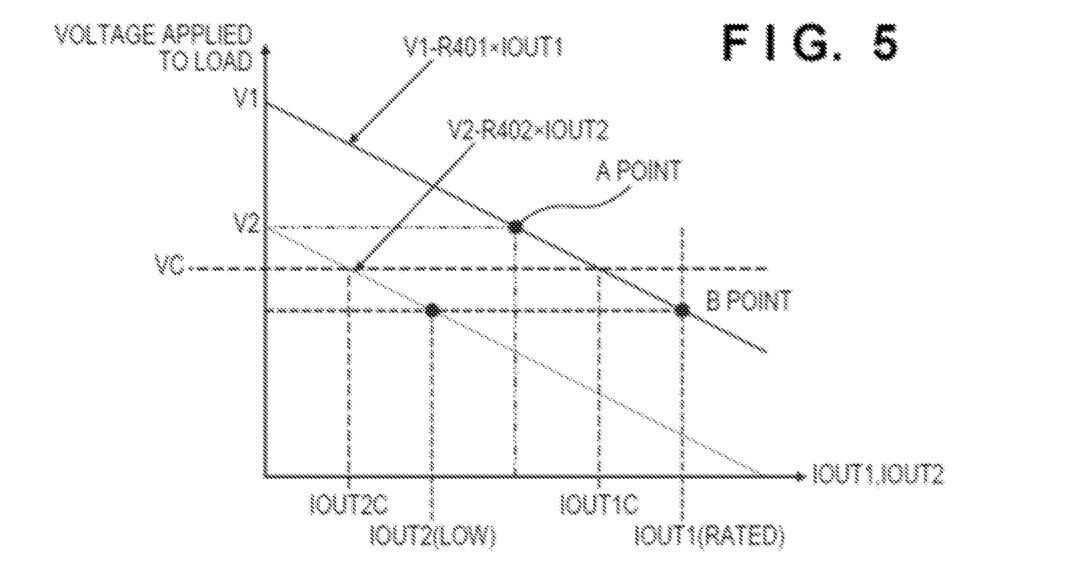
FIG. 5 is a view for describing the comparative example

FIG. 5 illustrates a relationship between the output current and the voltage applied to the load regarding the comparative example. As a current required by the load 400 increases, an output current IOUT1 of the motor power supply PS1 increases. Meanwhile, the voltage drop due to the resistor R401 also increases. Because of this, a voltage applied to the load 400 decreases. The load 400 comprises the motor driving circuit 225 and the motor 227. When the output current IOUT1 of the motor power supply PS1 reaches a current value of an A point, a voltage applied to the load matches the output voltage V2. With this, the motor power supply PS2 also starts outputting an output current IOUT2. The voltage drop due to the resistor R402 also occurs in the motor power supply PS2. For example, when a voltage for the load is VC, the output current IOUT1 of the motor power supply PS1 is the IOUT1C, and the output current IOUT2 of the motor power supply PS2 is IOUT2C. Accordingly, a current that is a sum of IOUT1C and IOUT2C is flowing in the load 400. Furthermore, a current flowing in the load 400 reaches a current value of a B point. Because the output current IOUT1 reaches a rated current IOUT1 (RATED) at the B point, the motor power supply PS1 is no longer able to increase the output current IOUT1. Here, as the motor power supplies PS1 and PS2 are connected in parallel, the motor power supply PS2 is no longer able to increase the output current IOUT2. That is, if the output current IOUT1 reaches the rated current IOUT1 (RATED), the motor power supply PS2 is no longer able to increase the output current IOUT2. The output current IOUT2 at this time is IOUT2 (LOW). In spite of the fact that the output current IOUT2 has yet to reach the rated current, the motor power supply PS2 is unable to increase the output current IOUT2. Thus, the capabilities of the motor power supply PS2 are not fully capitalized. As understood from FIG. 5, the smaller the difference between the output voltages V1 and V2, the more the capabilities of the motor power supply PS2 will be fully capitalized on. However, this requires that the mass production of the motor power supplies PS1 and PS2 be achieved with high accuracy, and thereby leads to an increase in cost of the motor power supplies PS1 and PS2.

First Embodiment

<Configuration of Power Supply Device>

Figure 6:
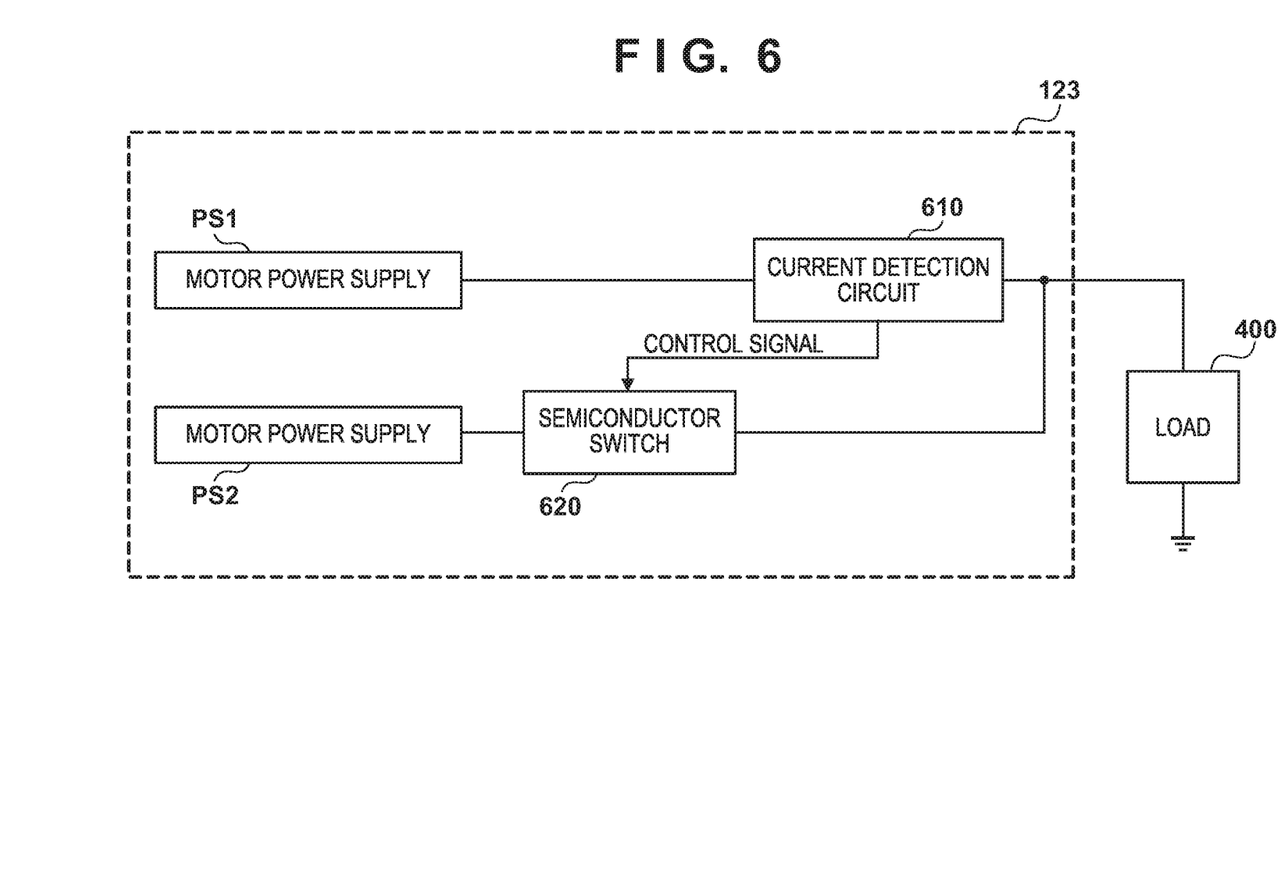
FIG. 6 is a view for describing the power supply device

FIG. 6 illustrates the power supply device 123 comprising the motor power supplies PS1 and PS2 according to the first embodiment. The output voltage V1 of the motor power supply PS1 in the first embodiment is lower than the output voltage V2 of the motor power supply PS2 (the output voltage V2 of the motor power supply PS2 is higher than the output voltage V1 of the motor power supply PS1). A relationship of voltages in the first embodiment is the total opposite of the relationship of voltages in the comparative example.

A current detection circuit 610 is arranged between the motor power supply PS1 and the load 400. The current detection circuit 610 monitors or detects a current supplied to the load 400 from the motor power supply PS1 and outputs a monitoring result (a detection result) to a semiconductor switch 620. The semiconductor switch 620 is a switching circuit arranged between the motor power supply PS2 and the load 400. The semiconductor switch 620 disconnects and connects the motor power supply PS2 and the load 400 based on the monitoring result.

Note that by arranging the current detection circuit 610 and the semiconductor switch 620, a voltage applied to the load 400 somewhat decreases. Generally, the motor 227 comprises a working voltage range (e.g. 34V to 38V, etc). As a result, as long as the power supply device 123 is able to supply a voltage in the working voltage range of the motor 227, the motor 227 is able to reach a target engine speed.

The current detection circuit 610 outputs a control signal to the semiconductor switch 620 when the current IOUT1 flowing from the motor power supply PS1 to the load 400 reaches a predetermined value. The semiconductor switch 620 changes from an infinite resistance value to an on-resistance value depending on the control signal.

<Switch Control>

Figure 7A:
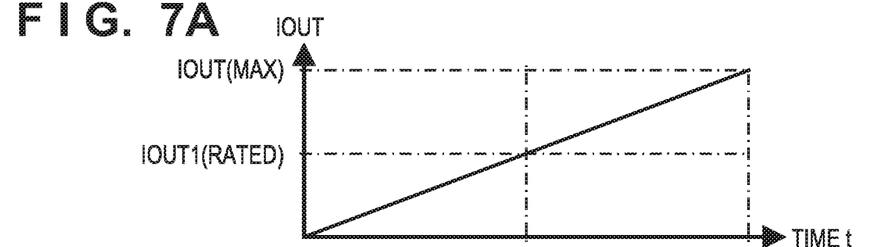
FIGS. 7A to 7C are views for describing a method for controlling the power supply device
Figure 7B:
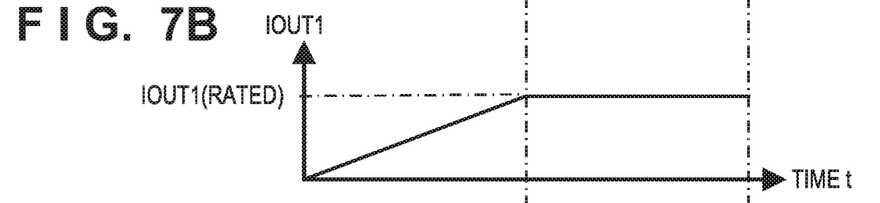
Figure 7C:
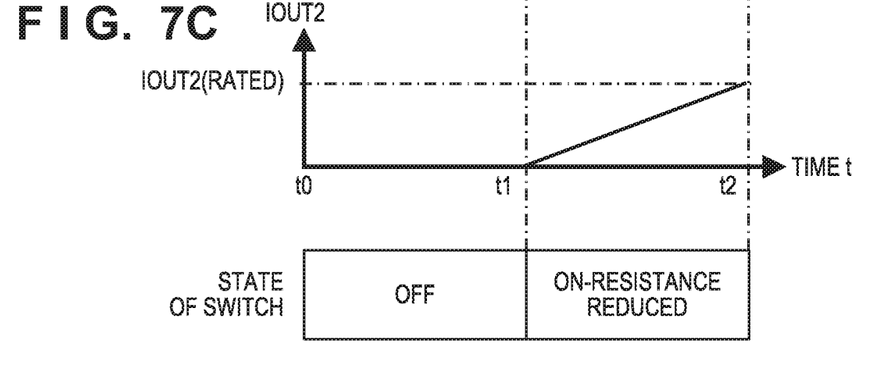

FIG. 7A illustrates the current IOUT flowing in the load 400. FIG. 7B illustrates the current IOUT1 outputted from the motor power supply PS1. FIG. 7C illustrates the current IOUT2 outputted from the motor power supply PS2. At time t0, the motor power supply PS1 which is a power supply with a lower output voltage starts to supply a current to the load 400. The motor power supply PS2 which is a power supply with a higher output voltage is not supplying a current to the load 400 at this point in time. As illustrated in FIG. 7A, the current IOUT flowing in the load 400 increases as time elapses. As a result, the output current IOUT1 of the motor power supply PS1 increases as time elapses.

At time t1, the output current IOUT1 of the motor power supply PS1 reaches the rated current IOUT1 (RATED). Thus, the motor power supply PS1 continues to output the rated current IOUT1 (RATED) from time t1 onward. Because the motor power supply PS1 comprises an excess current protection circuit, the motor power supply PS1 is unable to output the output current IOUT1 that exceeds the rated current IOUT1 (RATED). When the current detection circuit 610 detects that the output current IOUT1 has reached the rated current IOUT1 (RATED), the current detection circuit 610 outputs a control signal to a control terminal of the semiconductor switch 620. This control signal is a signal to switch the semiconductor switch 620 from off to on. With this, the semiconductor switch 620 turns on, and the motor power supply PS2 and the load 400 is connected. An internal resistance of the semiconductor switch 620 changes from an infinite resistance value to an on-resistance value.

From time t1 onward, the motor power supply PS2 gradually increases the output current IOUT2. At this time, IOUT is a sum of IOUT1 (RATED) and IOUT2.

At time t2, the output current IOUT2 of the motor power supply PS2 reaches IOUT2(RATED). Because the motor power supply PS2 also comprises the excess current protection circuit, the motor power supply PS2 is unable to output the output current IOUT2 that exceeds the rated current IOUT2 (RATED). Therefore, a maximum value IOUT (MAX) of the output current IOUT that the power supply device 123 is able to supply to the load 400 is a sum of the rated current IOUT1 (RATED) and the rated current IOUT2 (RATED). Although the output current IOUT could only be increased to the rated current IOUT1 (RATED) and the rated current IOUT2C in the comparative example, the output current IOUT can be increased to IOUT (MAX) in the first embodiment. That is, it becomes possible to fully capitalize on the capabilities of the motor power supply PS2.

<Circuit Configuration>

Figure 8:
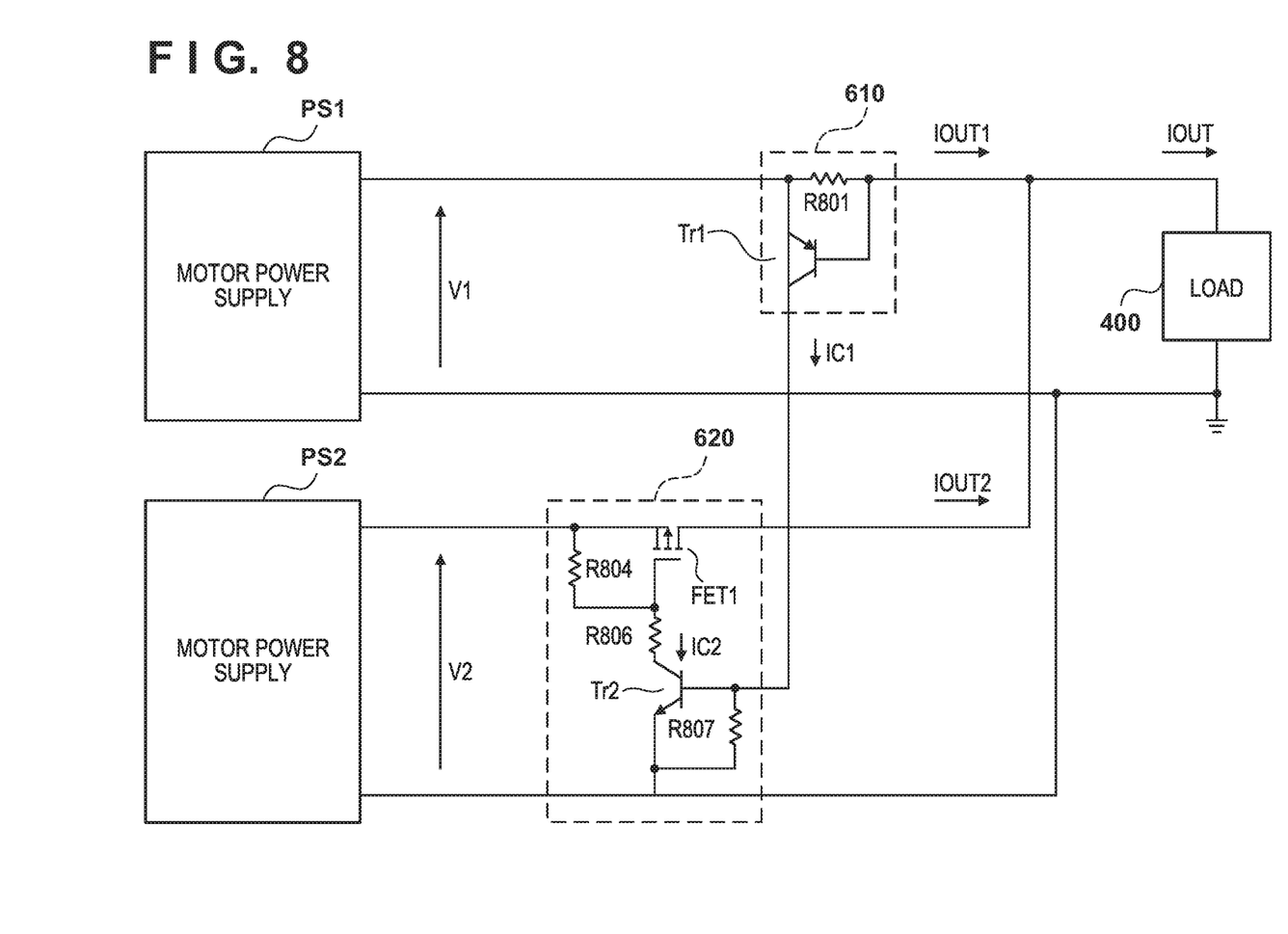
FIG. 8 is a circuit diagram of a control apparatus

FIG. 8 illustrates a circuit configuration of the current detection circuit 610 and the semiconductor switch 620. The current detection circuit 610 comprises a resistor R801 and a PNP-type transistor Tr1. A first terminal of the resistor R801 is connected to the motor power supply PS1, and a second terminal of the resistor R801 is connected to the load 400. An emitter of the transistor Tr1 is connected to the first terminal of the resistor R801. A base of the transistor Tr1 is connected to the second terminal of the resistor R801. A collector of the transistor Tr1 is connected to the base of a transistor Tr2 and the first terminal of a resistor R807. When the rated current IOUT1 (RATED) flows to the resistor R801, a voltage corresponding to a product of a resistance value r1 and the rated current IOUT1 (RATED) of the resistor R801 is generated on both ends of the resistor R801. The resistance value r1 of the resistor R801 is selected so that the voltage matches an inter base-emitter threshold voltage of the transistor Tr1. That is, when the rated current IOUT1 (RATED) flows to the resistor R801, the transistor Tr1 outputs a collector current IC1. The collector current IC1 corresponds to a control signal for turning the semiconductor switch 620 on.

The semiconductor switch 620 comprises a PMOS-type transistor FET1; resistors R804, R806, and R807; and a NPN-type transistor Tr2. A source of the transistor FET1 is connected to the motor power supply PS2. A drain of the transistor FET1 is connected to the load 400. The resistor R804 is connected between the source and the gate of the transistor FET1. The gate of the transistor FET1 and the collector of the transistor Tr2 are connected via the resistor R806. An emitter of the transistor Tr2 is connected to a ground potential. The resistor R807 is connected between a base and the emitter of the transistor Tr2.

When the collector current IC1 flows from the current detection circuit 610 to the resistor R807, the voltage that corresponds to a threshold voltage between the base and the emitter of the transistor Tr2 is generated in the resistor R807. That is, a resistance value r7 of the resistor R807 is selected so as to generate a voltage in the resistor R807 that corresponds to a threshold voltage between the base and the emitter of the transistor Tr2 when the collector current IC1 flows to the resistor R807. Because the voltage (IC1×r7) is generated between the base and the emitter of the transistor Tr2, the transistor Tr2 turns on, and a collector current IC2 flows to the collector of the transistor Tr2. This collector current IC2 flows to the collector of the transistor Tr2 via resistors R804 and R806. A resistance value of the resistor R804 is r4, and a resistance value of the resistor R806 is r6. A voltage (IC2×r4) is applied between the gate and the source of the transistor FET1. By this, the transistor FET1 is turned on, the motor power supply PS2 and the load 400 are connected, and the motor power supply PS2 starts outputting the output current IOUT2. Note that the resistance values r4 and r6 of the collector current IC2 are selected so as to cause the transistor FET1 to turn on when the collector current IC2 flows to the resistors R804 and R806.

Also, in a case where the collector current IC1 is not flowing to the resistor R807, the transistor Tr2 will be turned off, therefore, the collector current IC2 will not flow. Thus, the transistor FET1 is turned off, and the motor power supply PS2 is disconnected with respect to the load 400.

According to the first embodiment, the control apparatus starts supplying a current from a power supply with a high output voltage to the load when a current that is supplied from a power supply with a low output voltage to the load reaches the rated current. It becomes possible to fully capitalize the capabilities of a power supply with a low output voltage even when connecting a power supply with a low output voltage and a power supply with a high output voltage in parallel. Such a control apparatus can be formed by the current detection circuit 610 and the semiconductor switch 620.

In the first embodiment, it is assumed that the output voltage V1 of the motor power supply PS1 is lower than the output voltage V2 of the motor power supply PS2. However, this assumption is not necessary. For example, the output voltages V1 and V2 only have to satisfy Equation (1).

$$V1 < V2 - r_{on}(MIN) \times IOUT2(RATED) + r1 \times IOUT1(RATED) \qquad (1)$$

Here, ron(MIN) is a minimum value when the transistor FET1 is of an on-resistance. Equation (1) indicates a relationship between a first voltage on the motor power supply PS1 side encompassing a voltage drop due to the resistor R801 and a second voltage on the motor power supply PS2 side encompassing a voltage drop due to an on-resistance of the transistor FET1, as seen from the load 400. Equation (1) indicates that the second voltage is higher than the first voltage.

Second Embodiment

Figure 9:
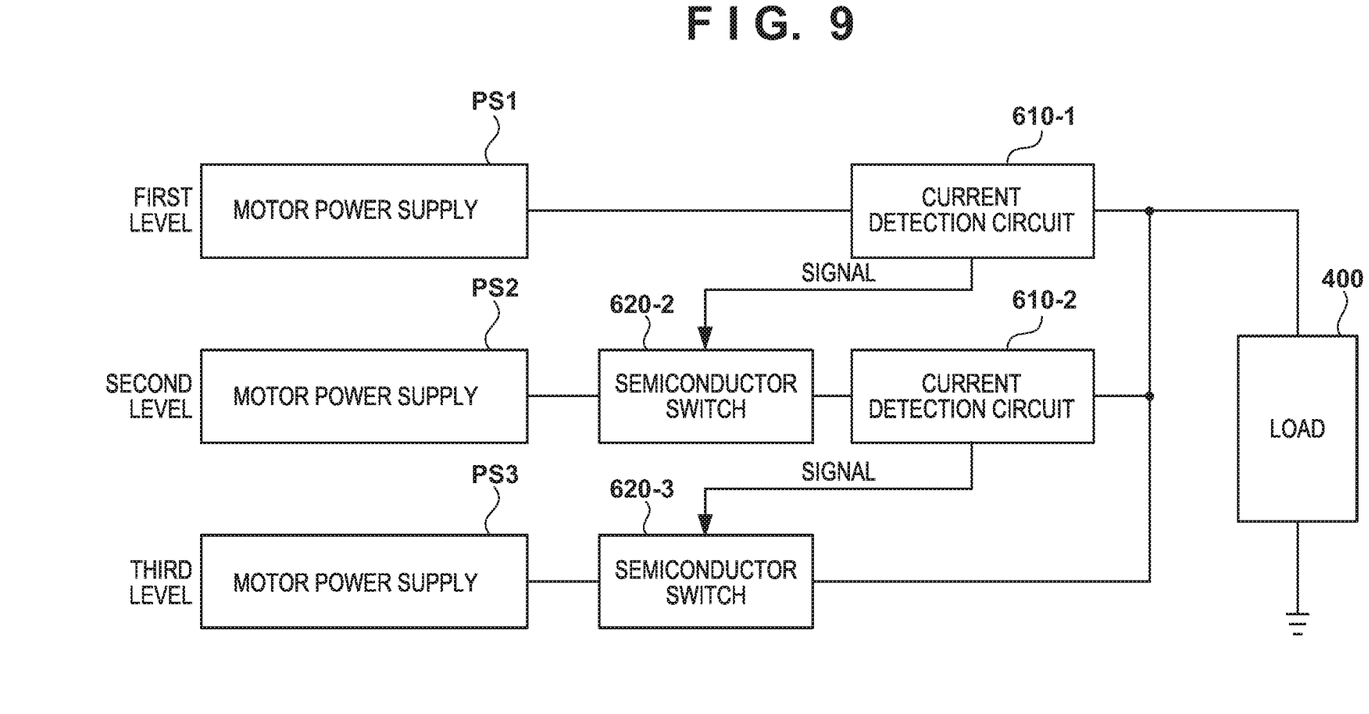
FIG. 9 is a view for describing the power supply device
Figure 10:
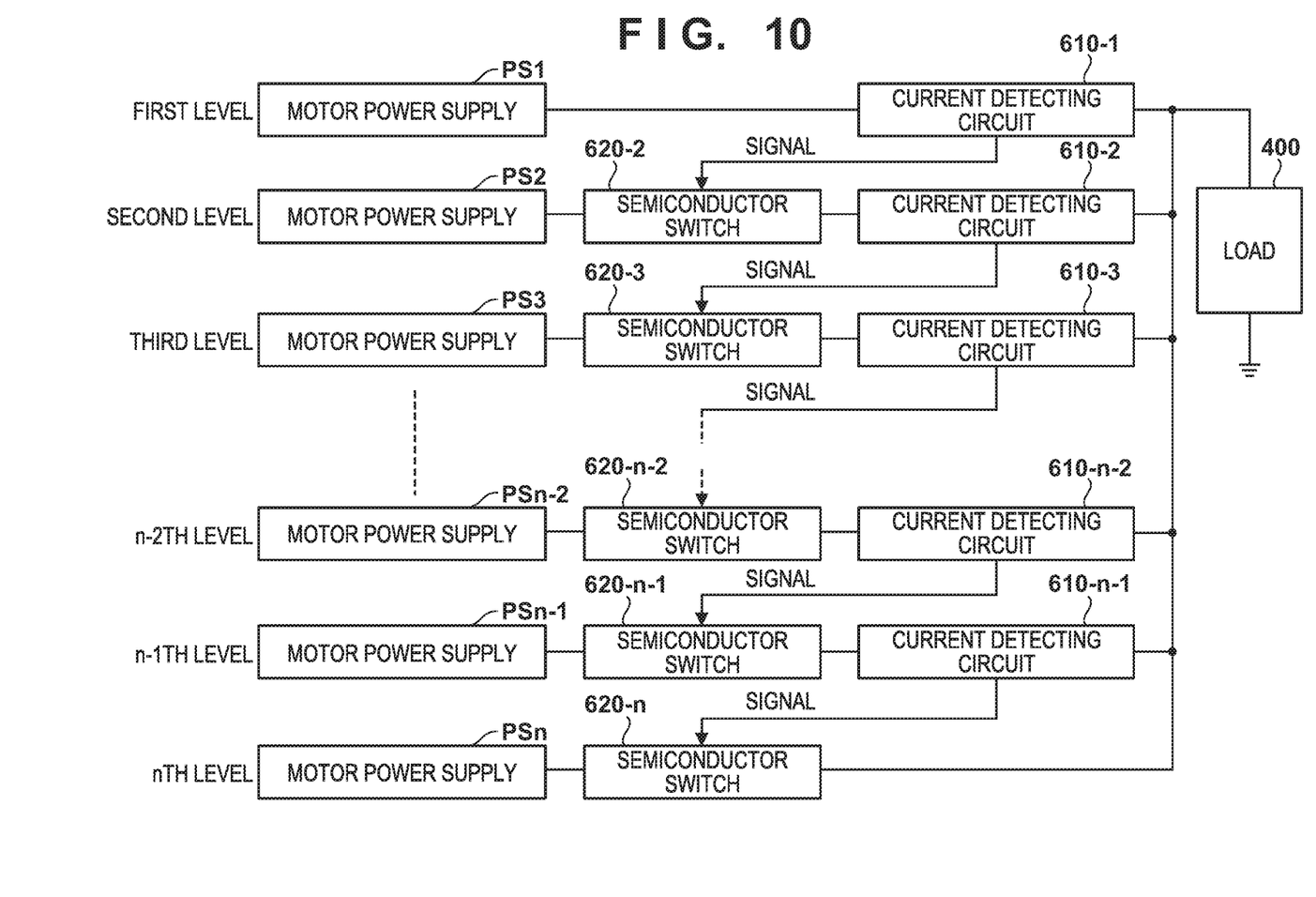
FIG. 10 is a view for describing the power supply device

Two switching power supplies are connected in parallel in the first embodiment. As illustrated in FIGS. 9 and 10, the technical concept of the present invention can be applied to cases where three or more switching power supplies are connected in parallel. Descriptions of previously described matters will be omitted.

In FIG. 9, the output voltage of a motor power supply PS3 is V3 (V1<V2<V3). In an initial state, semiconductor switches 620-2 and 620-3 are turned off (resistance value=infinite). When the output current IOUT1 from the motor power supply PS1 reaches the rated current, a current detection circuit 610-1 outputs a control signal to the semiconductor switch 620-2. The semiconductor switch 620-2 thereby is turned on, and the motor power supply PS2 starts outputting the output current IOUT2. When the output current IOUT2 from the motor power supply PS2 reaches the rated current, a current detection circuit 610-2 outputs a control signal to the semiconductor switch 620-3. The semiconductor switch 620-3 thereby is turned on, and the motor power supply PS3 starts outputting the output current IOUT3. As described above, the motor power supplies PS1, PS2, and PS3 are all fully able to exhibit their abilities.

According to FIG. 10, n units of motor power supplies PS1 to PSn are connected in parallel. An output voltage of the motor power supplies PS1 to PSn are respectively V1 to Vn (V1<V2< . . . <Vn−2<Vn−1<Vn). Here, an output voltage is Vi and an output current is IOUTi for an ith motor power supply PSi among n units of motor power supplies PS1 to PSn. An output voltage of an i−1th motor power supply PSi−1 is Vi−1, and an output current is IOUTi−1 (Vi−1<Vi). i is an integer from 2 to n.

In an initial state, semiconductor switches 620-2 to 620-n are turned off (resistance value=infinite). When an output current IOUTi−1 from the motor power supply PSi−1 reaches the rated current, a current detection circuit 610-i−1 outputs a control signal to the semiconductor switch 620-i. The semiconductor switch 620-i thereby is turned on, and the motor power supply PSi starts outputting the output current IOUTi. As described above, the lower an output voltage of a power supply, the earlier a control apparatus comprising the current detection circuit 610 and the semiconductor switch 620 starts outputting an output current. Because of this, the capability of each of n units of output power supplies can be fully capitalized on.

SUMMARY

[Aspect 1]

A power supply device 123 is an example of a power supply apparatus. A motor power supply PS1 is an example of a first power supply circuit that supplies power to a load. A motor power supply PS2 is connected to the first power supply circuit in parallel and is an example of the second power supply circuit that supplies power to the first power supply circuit and the load. The current detection circuit 610 functions as a monitoring unit that monitors a current that flows from the first power supply circuit to the load. The semiconductor switch 620 is a switch arranged between the second power supply circuit and load and functions as a switch that connects and disconnects the second power supply circuit and the load in accordance with a monitoring result of the monitoring unit. The semiconductor switch 620 disconnects the second power supply circuit and the load if a current flowing from the first power supply circuit to the load has not reached a predetermined value (e.g. a rated current). The semiconductor switch 620 connects the second power supply circuit and the load if a current flowing from the first power supply circuit to the load has reached a predetermined value. With this, the capabilities of a plurality of power supply circuits can fully be brought out even if there is a difference between the output voltages of a plurality of power supply circuits.

[Aspect 2]

The first power supply circuit and the second power supply circuit may each be a switching power supply. Because of this, even if there is a difference between output voltages of a plurality of switching power supplies, the capabilities of a plurality of switching power supplies can fully be brought out.

[Aspect 3]

The monitoring unit may comprise a current detection circuit and a signal generation circuit (e.g. the transistor Tr1). The resistor R801 is an example of a current detection circuit that detects a current flowing from the first power supply circuit to the load. The transistor Tr1 disconnects the second power supply circuit and the load if a current detected by the current detection circuit has not reached a predetermined value. The transistor Tr1 generates a control signal to connect the second power supply circuit and the load if a current detected by the current detection circuit has reached the predetermined value and outputs it to a switch. Accordingly, the monitoring unit can be achieved with few elements.

[Aspect 4]

The current detection circuit may be a current detection resistor (e.g. the resistor R801) that is connected between the first power supply circuit and the load. Accordingly, the current detection circuit can be achieved with few elements.

[Aspect 5]

As exemplified in FIG. 8, the current detection resistor comprises the first terminal connected to the first power supply circuit and the second terminal connected to the load. The signal generation circuit may be a PNP-type transistor comprising an emitter connected to the first terminal and a base connected to the second terminal of the current detection resistor and a collector connected to a control terminal of a switch. Accordingly, the signal generation circuit can be achieved with few elements.

[Aspect 6]

A resistance value (e.g. the resistance value r1) of the current detection resistor meets a requirement that a voltage generated between the first terminal and the second terminal of the current detection resistor matches a threshold voltage when a current of a predetermined value flows to the current detection resistor. The threshold voltage is an inter base-emitter threshold voltage of the PNP-type transistor. Accordingly, when a current greater than or equal to a predetermined value flow to the current detection resistor, the PNP-type transistor will be caused to output a control signal. Thus, the signal generation circuit can be achieved with few elements.

[Aspects 7 to 11]

A predetermined value may be a rated current of the first power supply circuit. Accordingly, it becomes possible to fully exhibit the capabilities of the first power supply circuit. A switch may be the semiconductor switch 620. Accordingly, a switch may be achieved with a simple element. The semiconductor switch 620 may be a PMOS-type transistor (e.g. the transistor FET1). Accordingly, the semiconductor switch 620 may be achieved with a relatively cheap element.

[Aspects 10 and 11]

As illustrated in FIG. 8, a source of the PMOS-type transistor may be connected to the second power supply circuit. A drain of the PMOS-type transistor may be connected to the load. As illustrated in FIG. 8, a first resistor (e.g. the resistor R804) connected between a gate of a PMOS-type transistor and a source of the PMOS-type transistor may be arranged. The transistor Tr2 may be a NPN-type transistor. The transistor Tr2 comprises a base connected to a monitoring unit, a collector connected to a gate of the PMOS-type transistor via the second resistor, and the emitter connected to the ground potential. The resistor R806 is an example of the second resistor. A third resistor (e.g. the resistor R807) connected between the base of the NPN-type transistor and the emitter of the NPN-type transistor may be arranged.

[Aspect 12]

A voltage is generated across the third resistor by a current flowing from the monitoring unit to the third resistor. When the voltage becomes higher than the threshold voltage between the base and the emitter of the NPN-type transistor, a current flows to the base of the NPN-type transistor. By this, the NPN-type transistor turns on and a current flows into the collector of the NPN-type transistor via the first resistor and the second resistor. The current flows from the collector of the NPN-type transistor to the emitter of the NPN-type transistor. Since the current flows the first resistor and the second resistor, the PMOS-type transistor turns on. The resistance value of the first resistor, the resistance value of the second resistor, and the resistance value of the third resistor are selected for these to be achieved.

[Aspects 13 and 14]

The output voltage V2 of the second power supply circuit may be higher than the output voltage V1 of the first power supply circuit. That is, the output voltage V1 of the first power supply circuit is lower than the output voltage V2 of the second power supply circuit. Or, it is sufficient that Equation (1) holds true between the output voltage of the second power supply circuit and the output voltage of the first power supply circuit.

[Aspect 15]

As described in the second embodiment, the present invention can be applied to three or more power supply circuits connected in parallel. The motor power supplies PS1 to PSn are examples of respective first to nth power supply circuits that supply power to the load. The motor power supplies PS1 to PSn are respectively connected to the load in parallel. The current detection circuit 610 is an example of a monitoring unit arranged respectively for first to n−1th power supply circuits. The current detection circuit 610 monitors a current that flows from a power supply circuit, which is a monitoring target, to the load. The semiconductor switch 620 is an example of a switch arranged respectively for second to nth power supply circuits. The semiconductor switch 620 is an example of a switch arranged between the power supply circuit, which is a control target, and load and is configured to connect and disconnect the power supply circuit, which is a control target, and the load in accordance with a monitoring result of the monitoring unit. A switch arranged for an ith power supply circuit among second to nth power supply circuits disconnects the ith power supply circuit and the load if a current that flows from an i−1th power supply circuit to the load has not reached a predetermined value. The switch connects the ith power supply circuit and the load if a current flowing from the i−1th power supply circuit to the load has reached a predetermined value. Accordingly, the capability of n units of power supply circuits can be fully brought out.

[Aspect 16]

In the first and second embodiments, the fixing apparatus 124 is an example of an image formation unit that is driven by the motor 227. However, the present invention may be applied to a power supply apparatus that drives another load. For example, the present invention may be applied to an electric device and an image forming apparatus that would not be able to drive a load by a single power supply circuit but are able to drive the load by connecting a plurality of power supply circuits in parallel.

[Aspect 17]

By virtue of the present invention, a method for controlling the first power supply circuit and the second power supply circuit that are connected to the load in parallel is provided. As illustrated in FIG. 7B, a process of starting a supply of current to the load is first performed from the first power supply circuit which has a relatively low rated output voltage between the first power supply circuit and the second power supply circuit. Next, a process of detecting whether the output current the first power supply circuit has reached the rated current of the first power supply circuit is executed. As illustrated in FIG. 7C, when the output current of the first power supply circuit reaches the rated current of the first power supply circuit, a process of starting a supply of current from the second power supply circuit, which has a relatively higher rated output voltage among the first power supply circuit and the second power supply circuit, to the load is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-151372, filed Aug. 21, 2019 which is hereby incorporated by reference herein in its entirety.

What is claimed is:

1. A power supply apparatus comprising:
a first power supply circuit configured to supply power to a load;
a second power supply circuit connected to the first power supply circuit in parallel and configured to supply power to the load together with the first power supply circuit;
a monitoring unit configured to monitor a current flowing from the first power supply circuit to the load; and
a switch arranged between the second power supply circuit and the load and configured to connect and disconnect the second power supply circuit and the load in accordance with a monitoring result of the monitoring unit,
wherein the switch is configured to disconnect the second power supply circuit and the load in a case where a current flowing from the first power supply circuit to the load has not reached a predetermined value and to connect the second power supply circuit and the load in a case where a current flowing from the first power supply circuit to the load has reached the predetermined value.

2. The power supply apparatus according to claim 1, wherein the first power supply circuit comprises a switching power supply and the second power supply circuit comprises a switching power supply.

3. The power supply apparatus according to claim 1, wherein the monitoring unit comprises:
a current detection circuit configured to detect a current flowing from the first power supply circuit to the load; and a signal generation circuit configured to generate a control signal and to output the control signal to the switch, the signal generation circuit generating the control signal which controls the switch to disconnect the second power supply circuit and the load in a case where the current detected by the current detection circuit has not reached the predetermined value and to connect the second power supply circuit and the load in a case where the current detected by the current detection circuit has reached the predetermined value.

4. The power supply apparatus according to claim 3, wherein the current detection circuit comprises a current detection resistor connected between the first power supply circuit and the load.

5. The power supply apparatus according to claim 4, wherein the current detection resistor comprises a first terminal connected to the first power supply circuit and a second terminal connected to the load; and
wherein the signal generation circuit comprises a PNP-type transistor comprising an emitter connected to the first terminal of the current detection resistor, a base connected to the second terminal, and a collector connected to a control terminal of the switch.

6. The power supply apparatus according to claim 5, wherein a resistance value of the current detection resistor meets a requirement that a voltage generated between the first terminal and the second terminal of the current detection resistor when a current of the predetermined value flows to the current detection resistor matches an inter base-emitter threshold voltage of the PNP-type transistor.

7. The power supply apparatus according to claim 1, wherein the predetermined value is a rated current of the first power supply circuit.

8. The power supply apparatus according to claim 1, wherein the switch comprises a semiconductor switch.

9. The power supply apparatus according to claim 8, wherein the semiconductor switch comprises a PMOS-type transistor.

10. The power supply apparatus according to claim 9, wherein a source of the PMOS-type transistor is connected to the second power supply circuit, and a drain of the PMOS-type transistor is connected to the load.

11. The power supply apparatus according to claim 10, further comprising:
a first resistor connected between a gate of the PMOS-type transistor and the source of the PMOS-type transistor;
an NPN-type transistor comprising a base connected to the monitoring unit, a collector connected to the gate of the PMOS-type transistor via a second resistor, and an emitter connected to a ground potential; and
a third resistor connected between the base of the NPN-type transistor and the emitter of the NPN-type transistor.

12. The power supply apparatus according to claim 11, wherein a resistance value of the first resistor, a resistance value of the second resistor, and a resistance value of the third resistor are selected so that when a voltage generated across the third resistor by a current flowing from the monitoring unit to the third resistor becomes higher than a threshold voltage between the base of the NPN-type transistor and the emitter of the NPN-type transistor, a current flows to the base of the NPN type transistor, and the NPN-type transistor turns on, a current flows into the collector of the NPN type transistor via the first resistor and the second resistor and flows out from the emitter of the NPN-type transistor, and the PMOS-type transistor turns on by the current flowing the first resistor and the second resistor.

13. The power supply apparatus according to claim 1, wherein an output voltage of the second power supply circuit is higher than an output voltage of the first power supply circuit.

14. The power supply apparatus according to claim 1, wherein the following relationship is established between an output voltage of the second power supply circuit and an output voltage of the first power supply circuit:

$$V1 < V2 - r\text{on(MIN)} \times I\text{OUT2(RATED)} + r1 \times I\text{OUT1(RATED)}$$

wherein V1 is an output voltage of the first power supply circuit, V2 is an output voltage of the second power supply circuit, ron(MIN) is a minimum value of an on-resistor of the switch, IOUT2(RATED) is a rated current of the second power supply circuit, r1 is a resistor of the monitoring unit, and IOUT1(RATED) is a rated current of the first power supply circuit.

15. A power supply apparatus comprising:
first to nth power supply circuits configured to respectively supply power to a load, n being an integer larger than 1, and the first to nth power supply circuits respectively connected in parallel to the load;
a monitoring unit respectively arranged for the first to n−1th power supply circuits, the monitoring unit configured to monitor a current flowing from a power supply circuit, which is a monitoring target, to the load;
a switch respectively arranged for the second to nth power supply circuits, the switch being arranged between a power supply circuit, which is a control target, and the load and configured to connect and disconnect a power supply circuit, which is the control target, and the load in accordance with a monitoring result of the monitoring unit;
wherein a switch arranged for an ith power supply circuit among the second to the nth power supply circuits disconnects the ith power supply circuit and the load if a current that flows from an i−1th power supply circuit to the load has not reached a predetermined value, and connects the ith power supply circuit and the load if a current that flows from an i−1th power supply circuit to the load has reached the predetermined value, i is any one of integer from 2 to n.

16. An image forming apparatus comprising:
a power supply apparatus;
a motor which is a load of the power supply apparatus; and
an image formation unit configured to be driven by the motor,
wherein the power supply apparatus comprises:
a first power supply circuit configured to supply power to a load;
a second power supply circuit connected to the first power supply circuit in parallel and configured to supply power to the load together with the first power supply circuit;
a monitoring unit configured to monitor a current flowing from the first power supply circuit to the load; and
a switch arranged between the second power supply circuit and the load and configured to connect and disconnect the second power supply circuit and the load in accordance with a monitoring result of the monitoring unit, and
wherein the switch is configured to disconnect the second power supply circuit and the load in a case where a current flowing from the first power supply circuit to the load has not reached a predetermined value and to connect the second power supply circuit and the load in a case where a current flowing from the first power supply circuit to the load has reached the predetermined value.

17. A method for controlling a first power supply circuit and a second power supply circuit connected in parallel to a load, the method comprising:
starting a supply of a current to the load first from the first power supply circuit whose rated output voltage is relatively lower than a rated output voltage of the second power supply circuit;
detecting whether an output current of the first power supply circuit has reached a rated current of the first power supply circuit; and
when the output current of the first power supply circuit reaches the rated current of the first power supply circuit, starting a supply of current from the second power supply circuit to the load, the rated output voltage of the second power supply circuit being relatively higher than the rated output voltage of the first power supply circuit.

* * * * *